Feb. 26, 1957  E. H. FLETCHER  2,782,652
VALVE STRUCTURE FOR STEERING MECHANISM
Filed May 25, 1954  2 Sheets-Sheet 1
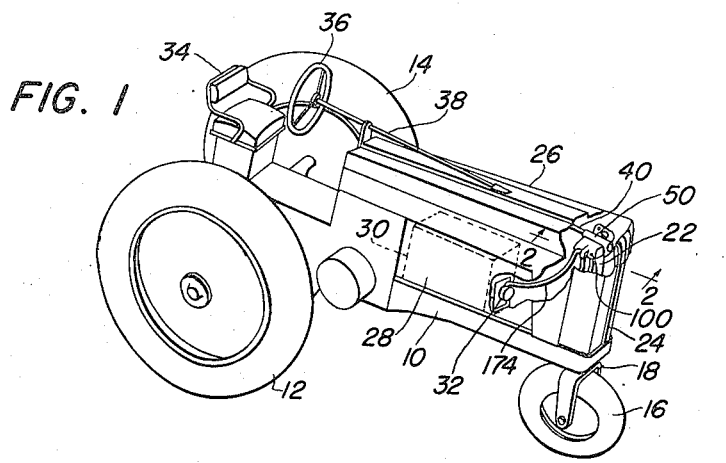
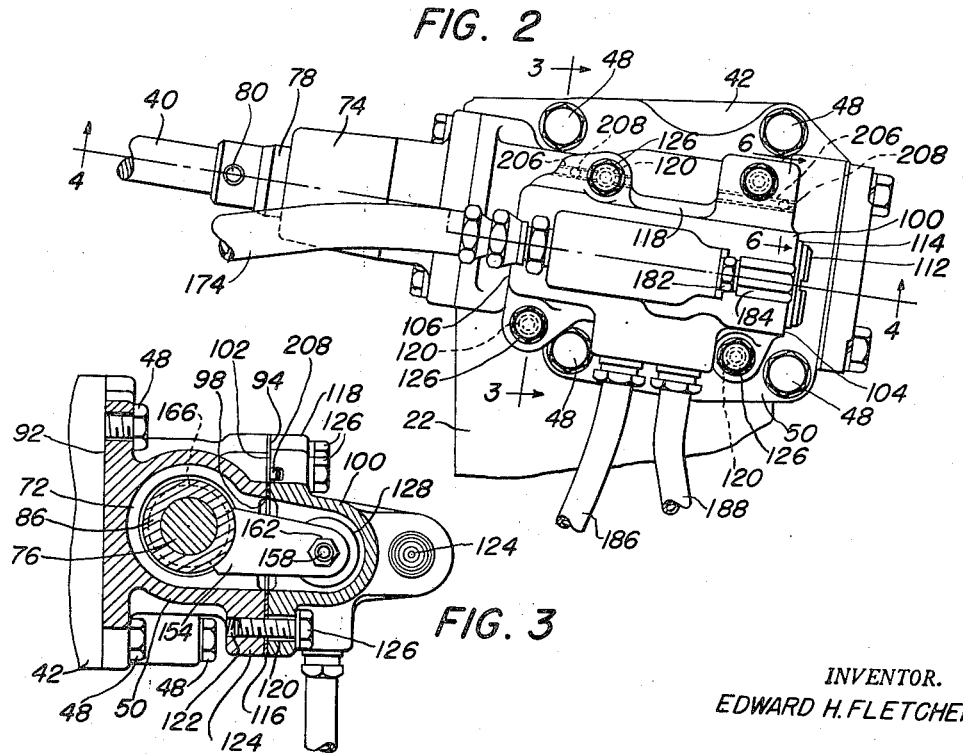
INVENTOR.
EDWARD H. FLETCHER Feb. 26, 1957     E. H. FLETCHER     2,782,652
VALVE STRUCTURE FOR STEERING MECHANISM
Filed May 25, 1954     2 Sheets-Sheet 2
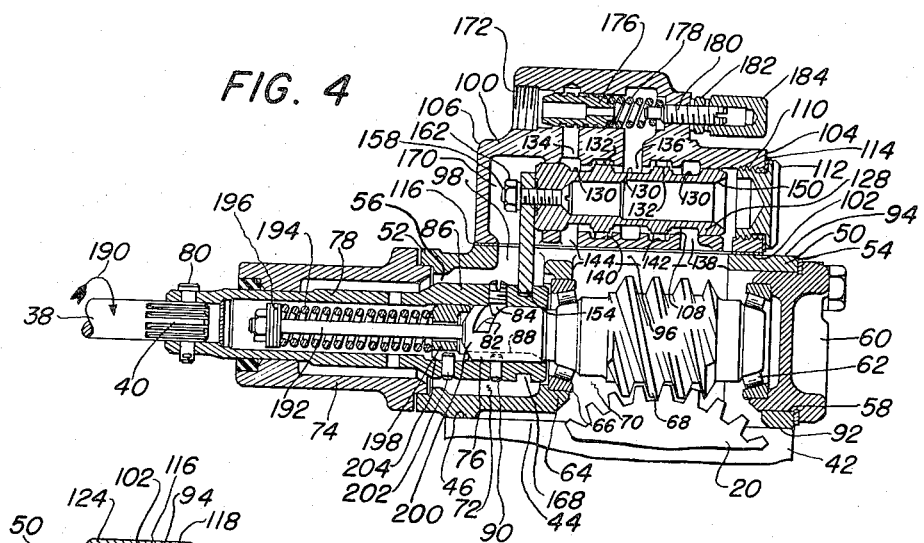
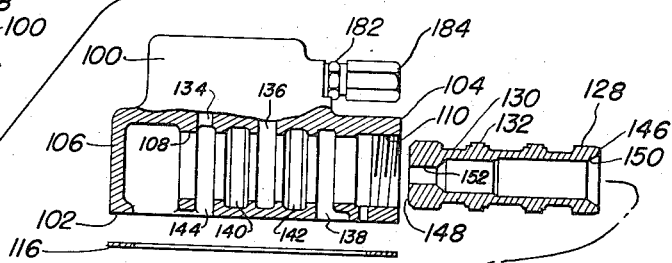
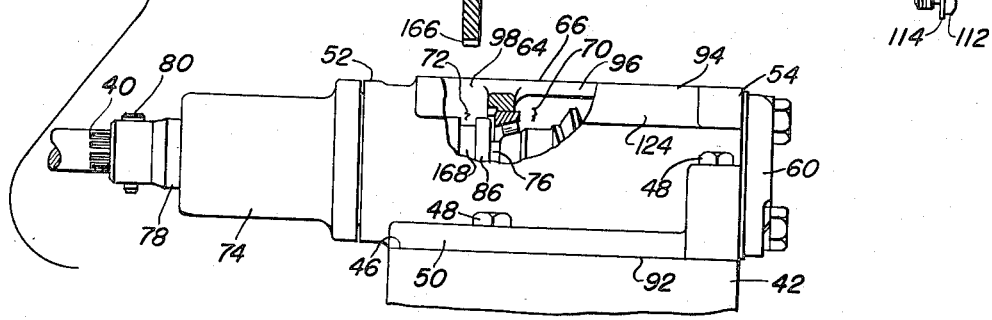
INVENTOR.
EDWARD H. FLETCHER United States Patent Office 2,782,652
Patented Feb. 26, 1957

2,782,652

VALVE STRUCTURE FOR STEERING MECHANISM

Edward H. Fletcher, Cedar Falls, Iowa, assignor to Deere Manufacturing Co., Dubuque, Iowa, a corporation of Iowa Application May 25, 1954, Serial No. 432,111

11 Claims. (Cl. 74—388)

This invention relates to steering control mechanism and more particularly to valve structure for such mechanism as is powered by fluid under pressure.

Conventional steering mechanism for an agricultural tractor will include in most instances an upright pedestal at the forward end of the tractor, which pedestal houses a vertical steering spindle to the lower end of which the front steerable wheel or wheels are connected and to the upper end of which is connected a worm gear driven selectively in opposite angular directions by a worm connected in turn to the steering wheel at the rear end of the tractor. A desirable form of hydraulic or fluid-pressure-powered steering means for steering mechanism of this type will utilize to as great an extent as possible the basic structure of the steering gear just described. In one form of such improvement or adaptation for the purposes of hydraulic power, a valve housing is mounted at the upper end of the pedestal and shifting of the valve is in response to slight relative movement between the steering wheel shaft and the steering worm. The hydraulic system is designed so that when the valve is in its neutral position, fluid will circulate relatively freely therethrough without causing the steerable wheel to be turned in either direction. However, when the operator turns the steering wheel and consequently the steering shaft, relative movement occurs between the shaft and the worm, because of a special time lag built into the mechanism, and this relative movement is utilized to shift the valve to supply fluid under pressure to one side or the other of a steering motor, depending upon the direction in which it is desired to steer. The control valve necessarily involves rather close tolerances and several problems have arisen in connection with proper adjustment to maintain the neutral position. In some forms of mechanisms, the interconnection between the control member—that responds to the turning of the steering wheel shaft—and the valve itself is relatively complicated and manufacturing tolerances accumulate to such an extent as to cause considerable delay in the response of the valve to turning of the steering wheel shaft. Simplification of the interconnection between the control member and the valve eliminates many of these problems but the problem of adjustment still remains. This problem can be solved in one manner by the provision of an adjustable connection between the control member and the valve but this solution is not completely satisfactory because it necessitates complicated housing structure and relatively complicated adjustment procedure.

According to the present invention, both of these problems are eliminated by an improved design in which the interconnection between the valve and control member is a rigid one-piece member secured to the valve member by a simple connection such as a screw and a nut. The valve housing is of one-piece construction and encloses the axially shiftable valve member, but the valve housing has in one side thereof an opening through which the valve connection or arm projects radially as respects the axis of shifting of the valve member. This projecting arm enters an opening in the control member housing, in which the control member is contained in a compartment. The connection between the arm and the control member is such that the valve housing, valve member and valve control arm may, as a unit, be mounted on or removed from the control member and worm housing in a direction transverse or radial to the axis of movement of the valve. Moreover, the mounting of the valve housing on the worm housing is such that the valve housing as a unit can be shifted relative to the worm housing. Since the control arm connection between the valve and the control member fixes the position of the valve, movement of the valve housing is relative to the valve, whereby proper adjustment of the valve in its neutral position may be easily obtained by loosening the securing means between the two housings and tapping the valve housing until it is properly located, after which the securing means can be tightened. Other features of the invention include a simple and inexpensive design; one that is easily maintained; and one that eliminates relatively movable parts, thereby eliminating cumulative manufacturing tolerances.

The foregoing and other important objects and desirable features inherent in and encompassed by the invention will become apparent as a preferred embodiment of the invention is disclosed in detail in the following specification and accompanying sheets of drawings, the several figures of which will be described immediately below.

Fig. 1 is a perspective view of one well known type of agricultural tractor, with a forward portion broken away to show the pertinent portions of the steering mechanism.

Fig. 2 is an enlarged elevational view, as seen generally along the line 2—2 of Fig. 1.

Fig. 3 is a transverse sectional view, as seen along the line 3—3 of Fig. 2.

Fig. 4 is a bottom sectional view, as seen along the line 4—4 of Fig. 2.

Fig. 5 is an exploded view, partly in section, showing the disassembled positions of the parts shown in Fig. 4.

Fig. 6 is a fragmentary sectional view, as seen along the line 6—6 of Fig. 2.

As mentioned above, Fig. 1 illustrates a tractor of a well known and popular type comprising a longitudinal main body 10 carried on rear traction wheels 12 and 14 and a steerable front wheel or wheel means 16. The wheel 16 is mounted in a fork or yoke 18 to the upper end of which is connected an upright steering spindle (not shown) to the upper end of which is secured a worm wheel or worm gear 20 (Fig. 4). The upright steering spindle is housed in an upright pedestal 22 which in its entirety is enclosed by a radiator grille 24 and the forward portion of a longitudinally extending hood 26. Slide enclosure means 28 associated between the sides of the hood 26 and the sides of the main frame or body 10 enclose an internal combustion engine shown generally in dotted lines at 30. From any suitable source within the engine, power may be taken to drive a fluid-pressure source shown here as a pump housing 32. This pump supplies fluid under pressure to hydraulic mechanism to be hereinafter described.

The tractor further includes at its rear end an operator's seat 34 ahead of which is a steering wheel 36, and a longitudinally extending steering shaft 38 extends forwardly to have its forward or terminal end 40 proximate to the upper end portion of the pedestal 22.

The upper end portion of the pedestal is in the form of a housing 42 that encloses the worm wheel 20, except for a side opening 44 through which a portion of the worm wheel is exposed. This side opening has a flat surface 46 on which is rigidly mounted, as by a plurality of cap screws 48, a worm and control member housing 50 (hereinafter referred to simply as the worm housing).

The worm housing 50 has opposite end wall portions 52 and 54, provided respectively with apertures or openings 56 and 58. The aperture 58 is closed by a removable end cap 60 that incorporates interiorly thereof an annular bearing 62, preferably of the tapered roller type. Positioned intermediate the end wall portions 52 and 54, but closer to the portion 52 than to the portion 54, is a transverse apertured partition 64 in which is mounted an annular bearing 66 coaxially with the bearing 62. This bearing, like the bearing 62, is preferably of the tapered roller type and the two bearings serve to journal coaxially therein a steering member in the form of a worm 68, which is in constant mesh with the worm gear or worm wheel 20. The end portions 52 and 54–60, plus the partition 64, separate the worm housing 50 into a worm compartment 70 and a control member compartment 72.

A tubular worm housing extension 74 is secured to the end portion 52 of the worm housing 50 in coaxial relationship to the axis of the worm 68 and bearings 62 and 66, which axis is, incidentally, common to the steering wheel shaft 38. The worm 68, although confined essentially to the worm compartment 70, includes a worm shaft extension 76 that projects into the control member compartment 72. This worm shaft extension and the coaxial terminal end portion 40 of the steering shaft 38 are interconnected by means including an elongated coaxial sleeve 78, which sleeve at its rear end is splined and pinned, at 80, to the terminal end 40 of the steering shaft and at its other end is connected to the worm shaft extension 76 by means of a helical or spiral slot 82 in the shaft extension and a slot follower 84 in the forward portion of the sleeve 78, which forward portion will be hereinafter referred to as a control member 86.

Since the control member 86 is of tubular or sleeve-like construction, its forward end is supported on the worm shaft extension 76. The rearward end of the sleeve 78 is appropriately journaled in the housing extension 74 which, as previously described, is coaxially secured over the rear end 52 of the worm housing 50. Since the sleeve 78 is pinned to the steering shaft 38 at the terminal end portion 40 of the steering shaft, it follows that rotation of the steering shaft by the steering wheel will cause rotation of the control member 86. The ordinary resistance of the front wheel 16 to steering or turning about the vertical axis of its upright spindle serves in effect to hold the worm 68 in a static position. Thereupon, the torque generated in the steering shaft will cause the control member 86 to rotate relative to the static worm 68, whereupon the guide pin 84 will tend to follow the helical or spiral slot 82. The result is that the control member 86 is shifted axially in one direction or the other, depending upon the direction of torque applied thereto by the steering shaft 38. The coupling sleeve 78 is free to slide axially in the worm housing extension 74.

The worm shaft extension 76 is shown as having therein an axial keyway 88, and a pin or dowel 90 carried by the control member 86 enters this keyway. The diameter of the dowel 90 is somewhat less than the width or angular dimension of the keyway 88 and accordingly relative angular movement to a limited extent between the control member 86 and the worm shaft 76 is not prohibited. The interconnection at 88–90 is significant as a mechanical connection that establishes a positive drive between the steering shaft 38 and worm 68 so that the worm may be turned manually for accomplishing manual steering in the event of failure of the hydraulic system. Apart from that, the connection at 82—84 is the only connection of primary importance so far as concerns the utilization of the relative axial movement between the static worm and the steering shaft for accomplishing control of the hydraulic system when that system is in normal working order, which system will be presently described below in connection with the novel valve structure.

The worm housing 50, in addition to having a flat side 92, by means of which it is mounted on the flat side 46 of the worm wheel housing portion 42, has an opposite flat side 94, which side is open, the arrangement being such that the side 94 has a pair of openings 96 and 98 respectively leading to or in register with the worm compartment 70 and the control member compartment 72. The sides 92 and 94 are perpendicular or normal to the end wall portions 52 and 54. Stated otherwise, the sides 92 and 94 are in planes parallel to the axis of the worm, worm shaft extension, control member 86, coupling sleeve 78 and steering shaft 38, which arrangement is important for purposes to be brought out presently. The side 94 serves as part of a means for mounting on the worm housing 50 a valve housing 100, which housing has a flat side or surface 102 that abuts or lies flatly against or on the side 94 of the worm housing 50. The valve housing 100 is somewhat elongated and has first and second opposite ends 104 and 106 and further includes a valve bore 108 on an axis parallel to the worm 68. The end 106 of the valve housing is preferably permanently closed, as shown, and the other end 104 has therein an opening in the form of a tapped bore 110 coaxial with the valve bore 108. The tapped bore 110 is normally closed by a closure such as a threaded plug 112 having a suitable gasket 114 thereon. A suitable gasket 116 is used between the side surface 94 of the worm housing 50 and the cooperating side surface 102 of the valve housing 100.

The valve housing 100 is flanged at 118 around what may be termed its base or marginal portion bordering the flat side 102 thereof, and this flange is provided with a plurality of apertures 120 in register with tapped bores 122 in a flange 124 that borders the flat side 94 of the worm housing 50. A plurality of cap screws 126 serves as releasable means for securing the two housings together, the cap screws passing respectively loosely through the openings or apertures 120 in the flange 118 and being threaded into the tapped bores 122 in the flange 124 on the housing 50. As best seen in Fig. 3, each of the apertures 120 is slightly larger than its received cap screw 126, so that the valve housing 100 may at times have movement relative to the worm housing 50 along the sliding surface established by the cooperation of the abutting or superimposed sides 94 and 102 of the housings (ignoring the gasket 116 for all practical purposes).

The valve bore 108 in the valve housing 100 carries for axial shifting therein a valve or valve member 128 on which are established several alternate lands and grooves 130 and 132 which serve as fluid-control portions variously cooperative with fluid ports and grooves 134, 136 and 138 and 140 and 142 that lead to the valve bore 108. As will be seen, the port 138 leads through the open side 102 of the valve housing 100 and thus communicates with the worm compartment 70. The port 134 is part of a groove that also leads at 144 through the open side 102 of the valve housing and, like the port 138, communicates with the worm housing 70. These ports serve as exhaust or tank ports for the valve housing and the worm compartment 70 consequently serves as a fluid reservoir. The same fluid is used for lubrication as is used in the fluid system.

The valve member 128 is itself hollow or tubular and has first and second opposite ends 146 and 148, the former of which has a coaxial opening 150 through which a tool may be inserted. The other end 148 is apertured at 152 to receive fastener means for mounting on that end of the valve member a control arm 154. This arm has a first or upper end apertured at 156 and, when the parts are assembled, the apertures 152 and 156 are alined to receive a fastener element in the form of a screw 158 which comprises part of the fastener means referred to above. The fastener means is completed by a washer 160 and nut 162. The slotted end of the screw 158, as at 164, provides a tool-receiving portion accessible to a tool inserted through the open end 150 of the valve 128. The design is specifically such as to accept a screw driver.

The opposite or second or free end of the control arm 104 is constructed in fork-like fashion, as best shown at 166 in Figs. 3 and 5. This portion of the arm 154 rides in an annular groove 168 that is formed in the control member 86. As best shown in Fig. 4, the portion of the valve housing 100 adjacent its end 106 affords a chamber or compartment 170 to accommodate axial shifting of the valve 128. Such shifting of the valve occurs in response to axial shifting of the control member 86 in the manner previously described, whereupon control of fluid under pressure through the various ports and passages is regulated.

The valve housing 100 has a portion thereof formed with an inlet opening 172 of which one end of a flexible fluid conduit 174 is connected, the other end of the conduit being connected to the engine-driven pump 32. The inlet at 172 incorporates a flow-control valve, designated in its entirety by the numeral 176, associated with which is a coil spring 178 on which the compression can be varied by means of an adjusting screw 180. This screw is retained, once adjusted, by a jam nut 182 and a removable cap 184 encloses the slotted end of the screw 180.

The grooves 140 and 142 in the valve bore 108 constitute motor grooves that communicate via motor passages (not shown) with motor lines 186 and 188. These lines lead respectively to opposite sides of a fluid motor (not shown) appropriately connected to the steerable wheel fork 18 and spindle (not shown) to rotate the spindle about its upright axis.

The valve 128 has a neutral position, which is that shown in Fig. 4. This position is maintained by a static position of the control member 86, as when the steerable wheel 16 is maintained in its straight-ahead position or some other position from which deviation is not immediately caused, either manually by the steering wheel or by side thrust from the terrain over which the tracer is operating, it being understood that axial movement of the control member 86 will occur in any instance in response to relative angular movement between the steering shaft 38 and worm 68, regardless of which is turned and which is stationary. With the parts neutrally positioned as thus described, fluid delivered by the engine-driven pump 32 will be transmitted through the hose or line 174 to the inlet 172. Depending upon the setting of the spring 178, a certain portion of this fluid will flow through the flow-control valve 176 and will enter the valve bore 108 via the inlet port 136. As will be seen, the lands 132 on the valve 128 are centered as respects the grooves 140 and 142, and this fluid will flow past these lands and into the exhaust or tank ports 138 and 144, and thence to the reservoir in the worm housing 50, having no effect on the steering control. If the steering wheel is turned in such direction as to move the steering shaft 38 angularly in the direction of the arrow 190 (clockwise, as viewed from the rear of the tractor to make a right-hand turn), the guide pin 84 in following the slot 82 in the worm shaft extension 76 will draw the control member axially forwardly, the worm 68 being, of course, axially immovable. This axial forward movement of the control member 86 is transmitted via the arm 154 to the valve 128, shifting the valve also axially forwardly, it being noted that the axes of the valve 128 and of the control member 86 are parallel. When the valve 128 shifts forwardly, its lands 132 cut off the grooves 140 and 142 around the valve bore 108 as respects communication of these grooves with the reservoir in the worm housing 50 and as respects the relatively free fluid transmission to 138 and 144. Instead, the high-pressure inlet 136 is connected via the land 130 of the valve 128 directly to the motor groove 142 which, as previously stated, communicates with the motor line 188. Fluid under pressure is thus transmitted to one side of the motor and the steerable wheel 16 is turned to the right. Fluid exhausted from the motor during that phase of the operation is returned via the other motor line 186 to the groove 140 and thence to the reservoir via 144. Just the opposite results are achieved when the steering shaft 38 is turned in the opposite direction, the control member 86 then moving axially rearwardly and carrying the valve with it.

Also shown in Fig. 4 is centering means for centering the relationship between the control member 86 and the shaft extension 76. This means comprises an elongated reduced-diameter extension 192 on the worm shaft extension 76. A coiled compression spring 194 encircles the extension 192 and acts between a headed end 196 on the extension 192 and a cam 198 engageable with a cam 200 on the rear end of the worm shaft extension 76. A dowel 202 passed through the control member 86 enters a keyway 204 in the cam 198 and serves to impart angular movement to the cam in accordance with angular movement of the control member 86. When this angular movement occurs, it occurs relative to the static worm shaft extension 76 and tends to separate the cams 198 and 200 as opposed by the spring 194. The cams are so designed as to seek their relative center positions as the spring 194 expands. These details are relatively unimportant to an understanding of the present invention and are described only generally because illustrated in the commercial embodiment of the structure disclosed.

The important features of the present invention are the manner in which the valve housing may be adjusted and the manner in which the valve, valve housing and its components may be assembled and disassembled.

As outlined above, the valve housing is carried on the worm housing by means of the cooperating flat sides or surfaces 94 and 102. Because the cap-screw-receiving apertures or holes 120 in the valve housing flange 118 are larger than the diameters of the threaded portions of the cap screws 126, adjustment of the valve housing relative to the worm housing is possible. It is important, however, that this adjustment be confined to a direction along a path parallel to the axis of the valve 128 and valve bore 108. For this purpose, the undersurface of the flange 118 at at least one side of the valve housing 100 is formed with guide means such as longitudinally alined keyways 206. Cooperative guide means in the form of upstanding dowels 208 are carried by the flange 124 of the worm housing 50. The keyways 206 are accurately machined on the basis of the axis of the valve bore 108, and the dowels 208 are accurately positioned for cooperation therewith. Thus, as the valve housing 100 is capable of adjustment along the axis of the valve bore 108, the cooperative means 206 and 208 serves to prevent deviation from this axial path in a direction transverse to that path. Stated otherwise, the means 206–208 lie along a line in a plane parallel to the valve bore axis. The surfaces 102 and 94 of the housings 100 and 50 respectively may also be accurately machined to prevent deviation of the valve housing in a plane normal to the plane just mentioned. However, accuracy at this point is not as material as accuracy in the positioning and alinement of the means 206–208. Normally, the cap screws 126 are tightened to maintain the position of the housing 100 on the housing 50.

However, when adjustment is required, the cap screws may be slightly loosened and the valve housing 100 tapped with a rubber or soft metal mallet. Adjustment is required to center the valve lands 132 relative to the valve bore grooves 140 and 142. This adjustment is relatively simple, especially since the cooperation between the end 156 of the control arm 154 and the annular groove 168 in the control member 86 results also from accurate machining. The arm 154 is rigidly secured to the valve 128 and there is no lost motion or play to build up cumulative tolerances. It will thus be clear from the foregoing that as long as the control member is in a static or fixed position, the valve will likewise occupy a static or fixed position. Now, with fluid being supplied to the inlet 172 and the cap screws 126 slightly loosened, the mechanic may lightly tap the valve housing 100 in one direction or the other along the straight-line path established by the means 206—208, until proper adjustment is obtained, which adjustment can be ascertained by the achievement of absolutely no steering movement of the wheel 16. After this adjustment is obtained, it may be secured by retightening of the cap screws 128.

Another feature of the invention, as indicated above, resides in the assembly and disassembly of the valve housing 100 and its components. When it is desired to remove the valve housing, it, together with its associated parts, is removable from the worm housing 50 merely by removing the cap screws 126. If permanent removal is desired, the hose will be disconnected at the inlet 172, since the hose is flexible, it accommodates not only adjustable movement of the valve housing 100 as explained above but also removal of the housing 100 completely. Although the motor lines 186 and 188, being also flexible, will accommodate adjustment of the housing 100, they will not accommodate removal of the housing and must be disconnected.

In any event, removal is effected, as said above, by removval of the cap screws 126. In view of the connection between the arm 154 and the control member 86, there is no interference with removal of the housing, valve and arm as a unit, since the connection just referred to is established along a path radial or transverse to the axis of the valve 108. Stated otherwise, the path just referred to is along the line or in the direction of removal and installation of the unit. When the valve housing and its components are removed as a unit, access may be had to the worm and control compartments through the side openings 96 and 98. Apart from this, if it is desired to disassemble the valve, the end cap or closure 112 is first removed and a screwdriver is inserted through the open end 150 of the valve and into engagement with the slotted end 164 of the fastening element or screw 158. Since the valve housing 100 has the chamber 170 at one end, which chamber opens to or is in register with the open side of the valve housing, a wrench may be easily inserted to grip the nut 162. As long as the arm 154 is in place, it prevents axial withdrawal of the valve member 128. Likewise, the connection between the valve member and the arm 154 prevents radial withdrawal of the arm 154. Disassembly is, of course, a matter of course after the fastening means 158—162 is removed.

The one-piece construction of the arm 154 and the rigid mounting thereof on the valve member 128 make these two parts in effect one piece and the only possible manufacturing error may occur in the connection at 156 between the arm 154 and the control member 186, as distinguished from complicated multi-piece connections of the type heretofore known.

Various other features and aspects of the invention, not specifically enumerated herein, will undoubtedly occur to those versed in the art, as will minor modifications and variations in the preferred embodiment of the invention illustrated, all of which may be achieved without departing from the spirit and scope of the invention as defined in the appended claims.

What is claimed is:

1. Steering control mechanism of the class described, comprising: a main housing having first and second opposite ends and a side transverse to said ends and further having an interior partition parallel to the first end to divide the housing into a control compartment adjacent to said first end and a worm compartment adjacent to the second end, said first end and partition having alined openings therein coaxial on an axis parallel to the side of the housing, and said side having an opening therein registering with the control compartment; a worm journaled in the worm compartment via the partition and on an axis coaxial with the axis of said end and partition openings, said worm having an axial shaft extension projecting into the control compartment; an external control member coaxial with the worm shaft extension and projecting into the control compartment, said member having thereon within said control compartment a coaxial sleeve supported on the worm shaft extension for both angular and axial movement relative to the housing; a valve housing having an open side abutting the side of the main housing in register with the control compartment opening and having a valve bore on an axis parallel to the worm and sleeve axis, said valve housing including fluid ports along the bore; a valve carried in the bore and having axially spaced fluid-control portions therein, said valve being selectively shiftable back and forth in the bore to opposite sides of a central neutral position to vary the relationship between said ports and fluid-control portions; an actuating arm fixed to the valve and projecting through the open sides of the valve housing and main housing and into the control compartment; means interconnecting the arm and the control sleeve for incurring fixation and shifting of the valve in response respectively to fixation and axial shifting of the control sleeve; and securing means rigidly securing the housings together, said securing means being releasable to enable shifting of the valve housing relative to the main housing and valve along a path parallel to the axis of the valve for securing adjustment of the neutral relationship between the ports and fluid portions while the valve position is fixed by fixation of the control sleeve.

2. Steering control mechanism of the class described, comprising: a main housing having first and second opposite ends and a side transverse to said ends and providing a compartment in said housing, said side and first end each having an opening therethrough leading to said compartment; a steering member journaled in the compartment on an axis parallel to the housing side and partment on an axis parallel to the housing side and having an axial shaft extension adjacent to the first end of the housing; an external control member having a sleeve projecting into the compartment via said first end opening and coaxially received by the shaft extension for movement along an axis parallel to the side of said main housing, said sleeve being exposed through said side opening; a valve housing having a side abutting the side of the main housing and said valve housing side having an opening therein in register with the main housing side opening, said valve housing having a valve bore on an axis parallel to the sleeve axis, said valve housing including fluid ports along the bore; a valve carried in the bore and having axially spaced fluid-control portions therein, said valve being selectively shiftable back and forth in the bore to opposite sides of a central neutral position to vary the relationship between said ports and fluid-control portions; an actuating arm fixed to the valve and projecting through the open sides of the valve housing and main housing and into the compartment and in proximity to the sleeve; means interconnecting the arm and the control sleeve for incurring fixation and shifting of the valve in response respectively to fixation and axial shifting of the control sleeve; and securing means rigidly securing the housings together, said securing means being releasable to enable shifting of the valve housing relative to the main housing and valve along a path parallel to the axis of the valve for securing adjustment of the neutral relationship between the ports and fluid portions while the valve position is fixed by fixation of the control sleeve.

3. Steering control mechanism of the class described, comprising: a main housing having first and second opposite ends and a side transverse to said ends and providing a compartment in said housing, said side and first end each having an opening therethrough leading to said compartment; a steering member journaled in the compartment; an external control member projecting into the compartment via said first end opening and associated with the steering member for movement along an axis parallel to the side of said main housing, said control member being exposed through said side opening; a valve housing having a side abutting the side of the main housing and said valve housing side having an opening therein in register with the main housing side opening, said valve housing having a valve bore on an axis parallel to the control member axis, said valve housing including fluid ports along the bore; a valve carried in the bore and having axially spaced fluid-control portions therein, said valve being selectively shiftable back and forth in the bore to opposite sides of a central neutral position to vary the relationship between said ports and fluid-control portions; an actuating arm fixed to the valve and projecting through the open sides of the valve housing and main housing and into the compartment and in proximity to the control member; means interconnecting the arm and the control member in the compartment for incurring fixation and shifting of the valve in response respectively to fixation and axial shifting of the control member; and securing means rigidly securing the housings together, said securing means being releasable to enable shifting of the valve housing relative to the main housing and valve along a path parallel to the axis of the valve for securing adjustment of the neutral relationship between the ports and fluid portions while the valve position is fixed by fixation of the control member.

4. Steering control mechanism for a tractor of the type having a main body, a steering support, a steering wheel remote from the support and including a steering shaft proximate to the support, and a fluid-pressure source on the body spaced from the support, said mechanism comprising: a main housing rigid on the support and having a compartment and a wall portion provided with an opening leading to said compartment; a control member in the compartment and connected to the steering shaft for movement by the steering wheel among various fixed positions; a valve housing adjacent to the main housing and having a valve bore and fluid ports associated with said bore, said valve housing having a wall portion provided with an opening leading to the valve bore and further having a fluid inlet leading to said bore; a valve axially shiftable in the valve bore between a neutral position and active positions and having fluid-control portions variously cooperative with the fluid ports according to the position of the valve; a control arm rigid on the valve and projecting through the opening of the valve housing and through the opening in the main housing and into the compartment of said main housing and further into proximity to the control member; means interconnecting the arm and the control member for effecting axial shifting of the valve in response to changes in position of the control member; means supporting the valve housing on the main housing for adjustable positioning of the valve housing relative to the main housing along a path parallel to the axis of the valve bore, said valve housing being thereby adjustable also relative to the valve when said valve is fixedly positioned by the fixedly positioned control member and control arm; a flexible fluid conduit interconnecting the fluid-pressure source and the fluid inlet in the valve housing for accommodating adjustable positioning of the valve housing; and means for rigidly securing the housings together in any selected adjusted position of the valve housing.

5. Steering control mechanism for a tractor having a main body supported by means including a steerable wheel steering by means of a steering worm gear and a steering shaft having a terminal end proximate to the worm gear, said mechanism comprising: a worm housing supported on the body adjacent to the worm gear and including first, second and third housing portions provided respectively with first, second and third openings, said worm housing being positioned with the first opening alined with the worm gear and the second opening alined with the terminal end of the steering shaft; a rotatable worm in the worm housing and meshing with the worm gear via the first opening and including a shaft extension exposed through the second opening to the terminal end of the steering shaft; means interconnecting the worm shaft extension and the terminal end of the steering shaft, including a control member within the worm housing and exposed through the third opening and shiftable along an axial path in response to turning of the steering shaft; a valve housing adjacent to the worm housing and having an open side alined with the aforesaid third opening, said valve housing having a valve bore therein on an axis parallel to the axial path of the control member, said valve housing further having fluid ports spaced axially along the bore; a valve shiftable axially along the valve bore between neutral and active positions and having fluid-control portions variously cooperative with the fluid ports; releasable means mounting the valve housing on the worm housing for removal and installation of the valve housing as respects the worm housing respectively in opposite directions along a path radial to the valve and control member axes; a one-piece control arm secured to the valve and projecting therefrom along the aforesaid radial path and through the open side of the valve housing, through the third opening in the worm housing and into proximity to the control member within the worm housing; and means connecting the arm to the control member for incurring shifting of the valve in response to movement of the control member, said last-named means including cooperative portions respectively on the arm and control member connectible and disconnectible along said radial path to enable removal and installation of the valve housing, valve and arm as a unit relative to the worm housing.

6. Valve structure for steering control mechanism of the type having a compartmented support including an open side through which a movable control member is exposed, said structure comprising: a valve housing having an open side cooperative with the side of the support and affording means by which the valve housing is mounted on the support, said valve housing having first and second opposite ends normal to its open side and a valve bore on an axis running between and generally coaxial with said ends, said first end having an opening therethrough coaxial with and of larger diameter than the valve bore; an externally removable closure supported by the first end for selectively covering and uncovering the opening in said first end; a valve member axially insertable and withdrawable through the uncovered opening and into and out of the valve bore for normal support by the bore for axial shifting in said bore, said valve member being axially hollow and having first and second ends proximate respectively to the first and second ends of the valve housing, said first end of the valve member having a coaxial tool-access opening thereon and said second end of the valve housing having a fastener-receiving aperture therein; a control arm positioned at the second end of the valve member and projecting radially therefrom and through the valve housing open side, said arm having a first end proximate to the second end of the valve member and further having a second end provided with means for effecting radially directed connection to and disconnection from the aforesaid exposed control member; fastener means connecting the first end of the arm to the second end of the valve member and normally preventing radial separation of the arm from the valve member and also normally preventing axial withdrawal of the valve member from the valve housing, said fastener means including a releasable fastener element passed through the fastener-receiving aperture in said second end of the valve member and having a tool-receiving portion within the valve member and facing toward the aforesaid tool-access opening in the first end of the valve member, whereby said element may be released by a tool inserted through the uncovered first opening of the valve housing so that the arm may be removed radially from the valve member via the open side of the valve housing and the valve member may thereafter be axially withdrawn from the valve housing via said uncovered opening in said first end of the valve housing.

7. Control mechanism of the class described, comprising: a main housing having a compartment therein and an open side leading to said compartment; a control member movable in the compartment from a fixed position to various adjusting positions; a valve housing having a valve bore therein and an open side abutting and at times slidable along the open side of the main housing, said valve housing having fluid ports leading to the bore; a valve carried in the bore and having axially spaced fluid-control portions, said valve being shiftable axially along the bore between a neutral position and at least one active position; a valve control arm fixed to the valve against relative axial movement and projecting through the open sides of the housings into proximity to the control member; means interconnecting the arm and the control member for causing the arm and valve to remain fixed when the control member is fixed and for causing axial movement of the arm and valve in response to movement of the control member; securing means normally interconnecting the housings as a unit, and said securing means being releasable to enable sliding of the valve housing relative to the main housing via said abutting housing sides so that adjustment of the relationship between the fluid-control portions of the valve and the valve housing ports may be obtained by shifting the valve housing axially relative to the valve and main housing while the position of the valve is fixed by the fixed position of the control member; and cooperative means between the housings for insuring sliding of the valve housing along a path parallel to the valve axis, comprising a key member carried by one housing at its open side and a groove in the open side of the other housing paralleling said valve axis.

8. Control mechanism of the class described, comprising: a main housing having a compartment therein and an open side leading to said compartment; a control member movable in the compartment along a defined path from a fixed position to various adjusting positions; a valve housing having a valve bore therein and an open side abutting and at times slidable along the open side of the main housing, said valve housing having fluid ports leading to the bore; a valve carried in the bore and having spaced fluid-control portions, said valve being movable in the bore between a neutral position and at least one active position; a valve control arm connected to the control member for movement by said control member and projecting through the open sides of the housings into proximity to the valve; means interconnecting the arm and the valve for causing the valve to remain fixed when the control member and arm are fixed and for causing movement of the valve in response to movement of the control member and arm; securing means normally interconnecting the housings as a unit, and said securing means being releasable to enable sliding of the valve housing relative to the main housing via said abutting housing sides so that adjustment of the relationship between the fluid-control portions of the valve and the valve housing ports may be obtained by shifting the valve housing axially relative to the valve and main housing while the position of the valve is fixed by the fixed position of the control member; and cooperative means between the housings for insuring sliding of the valve housing along a path parallel to the path of movement of the control member, comprising a key member carried by one housing at its open side and a groove in the open side of the other housing paralleling said control member path.

9. Hydraulic steering control mechanism, comprising: a steering gear housing having a compartment therein and including a mounting face having an opening therein leading to said compartment; a steering control member movable in the compartment from a fixed position to various adjusting positions; a steering valve housing adjacent to the main housing and having a valve bore therein and including a mounting face in face-to-face contact with the mounting face of the steering gear housing, said valve housing mounting face being provided with an opening alined with the opening in the steering gear housing mounting face, said valve housing having fluid ports leading to the bore; a steering valve carried in the bore and having spaced fluid-control portions, said valve being selectively positionable in the bore between a neutral position and at least one active position; a valve control arm connected to and for positioning the valve and projecting through the openings of the housings into proximity to the control member; means interconnecting the arm and the control member for causing the arm and valve to remain fixed when the control member is fixed and for causing movement of arm along a defined path and accordingly causing positioning of the valve in response to movement of the control member; said mounting faces mounting the steering valve housing directly on the steering gear housing for sliding adjustment of the steering valve housing relative to the steering gear housing in the direction of movement of the arm; and securing means passed through one mounting face and into the other and normally interconnecting the housings as a unit, and said securing means being releasable to enable sliding of the valve housing relative to the main housing so that adjustment of the relationship between the fluid-control portions of the valve and the valve housing ports may be obtained while the position of the valve is fixed by the fixed position of the control member.

10. Control mechanism of the character described, comprising: a main housing having a compartment and a wall portion provided with an opening leading to the compartment; a control member movable in the compartment from a fixed position to other fixed positions; a valve housing adjacent to the main housing and having a valve bore and fluid ports associated with said bore, said valve housing having a wall portion provided with an opening leading to the valve bore; a valve axially shiftable in the valve bore between a neutral position and active positions and having fluid-control portions variously cooperative with the fluid ports according to the position of the valve; a control arm rigid on the valve and projecting through the opening of the valve housing and through the opening in the main housing and into the compartment of said main housing and further into proximity to the control member; means interconnecting the arm and the control member for effecting axial shifting of the valve in response to changes in position of the control member; means supporting the valve housing on the main housing for adjustable positioning of the valve housing relative to the main housing along a path parallel to the axis of the valve bore and including cooperative abutting surfaces respectively on the housings and parallel to the valve bore axis in a first plane, and cooperative interengaging guide elements respectively on the housings and parallel to the valve bore axis in a second plane intersecting the first plane, said valve housing being thereby adustable also relative to the valve when said valve is fixedly positioned by the fixedly positioned control member and control arm; means for rigidly securing the housings together in any selected adjusted position of the valve housing, said securing means including a plurality of removable members passing through the housings in a direction normal to the first plane for enabling separation of the housings in said direction; and said control arm releasably engaging the control member for release of said arm from said control member in the aforesaid direction of separation of the valve housing so that the valve housing, valve and control arm are removable as a unit from the main housing.

11. Steering control mechanism of the class described, comprising: a main housing having first and second opposite ends and a side transverse to said ends and providing a compartment in said housing, said side and first end each having an opening therethrough leading to said compartment; a steering member journaled in the compartment on an axis parallel to the housing side and having an axial shaft extension adjacent to the first end of the housing; an external control member having a sleeve projecting into the compartment via said first end opening and coaxially received by the shaft extension for movement along an axis parallel to the side of said main housing, said sleeve being exposed through said side opening; a valve housing having a side abutting the side of the main housing and said valve housing side having an opening therein in register with the main housing side opening, said valve housing having a valve bore and fluid ports along the bore; a valve carried in the bore and having spaced fluid-control portions therein, said valve being selectively movable in the bore to opposite sides of a central neutral position to vary the relationship between said ports and fluid-control portions; an actuating arm movable along a defined path for selectively moving the valve, said arm being fixed to the valve and projecting through the open sides of the valve housing and main housing and into the compartment and in proximity to the sleeve; means interconnecting the arm and the control sleeve for incurring fixation and movement of the arm in response respectively to fixation and axial shifting of the control sleeve; and securing means rigidly securing the housings together, said securing means being releasable to enable shifting of the valve housing relative to the main housing and valve along the path of movement of the arm for securing adjustment of the neutral relationship between the ports and fluid portions while the valve position is fixed by fixation of the control sleeve.

References Cited in the file of this patent
UNITED STATES PATENTS

| | | |
|---|---|---|
| 1,651,838 | Roberts | Dec. 6, 1927 |
| 2,292,805 | Tippen | Aug. 11, 1942 |
| 2,602,671 | Eastman | July 8, 1952 |
| 2,682,778 | Creson | July 6, 1954 |